S. L. WIEGAND.

Improvement in Sectional Steam-Generators.

No. 5,076. Reissued Sep. 24, 1872.

WITNESSES.

Wm. F. Johnson

C. B. Duncan

INVENTOR.

S. Lloyd Wiegand

AM. PHOTO-LITHOGRAPHIC CO. N.Y. (OSBORNE'S PROCESS.)

UNITED STATES PATENT OFFICE.

S. LLOYD WIEGAND, OF PHILADELPHIA, PENNSYLVANIA, ASSIGNOR, BY MESNE ASSIGNMENTS, TO HIMSELF AND WALTER J. BUDD, FOR HIMSELF AND AS TRUSTEE FOR NELSON J. NICKERSON AND EDWARD H. GRAHAM.

IMPROVEMENT IN SECTIONAL STEAM-GENERATORS.

Specification forming part of Letters Patent No. 67,621, dated August 6, 1867; reissue No. 5,076, dated September 24, 1872.

*To all whom it may concern:*

Be it known that I, S. LLOYD WIEGAND, of the city of Philadelphia and State of Pennsylvania, have invented a new and useful Steam-Generator; and I do hereby declare that the following is a full, clear, and exact description thereof, reference being had to the accompanying drawing and the letters of reference marked thereon.

Figure 1:
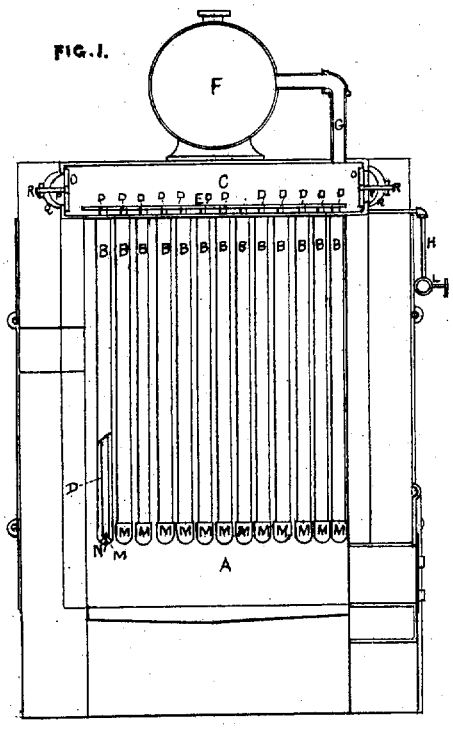
Figure 2:
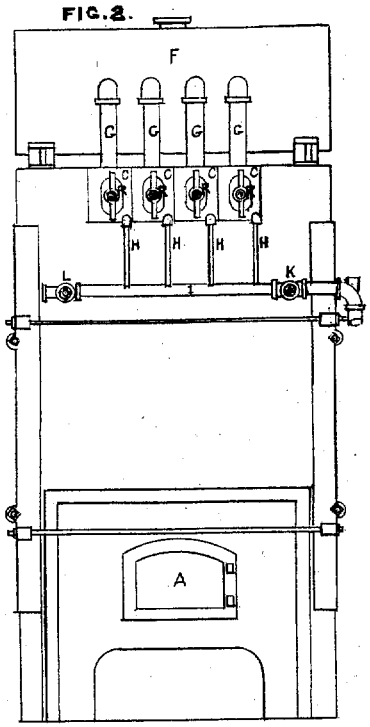
Figure 3:
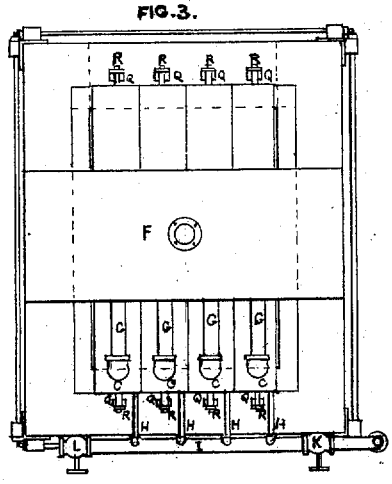

Figure 1 is a sectional elevation thereof; Fig. 2 is a front elevation thereof; and Fig. 3 is a plan thereof.

The same letters of reference apply to the same parts in the several figures.

The nature of this invention consists in forming a safe sectional steam-generator of a series of vessels connected together, each having tubes descending therefrom into a fire-chamber; further, in providing each tube with an arrangement which insures an active circulation of water in it, and at the same time avoiding such joints as are difficult to make or repair by ordinary laborers. By this means I am enabled to make a steam-generator incapable of destructive explosion, which may be transported in sections and erected readily by persons of moderate mechanical skill, and at the same time is so compact as to require an inexpensive setting; and changes of temperature do not strain the joints with unequal expansion and contraction, because each tube is free to expand and contract irrespective of the others.

I will now proceed to describe more particularly the construction and operation of this invention.

In a furnace-chamber, A, is placed a number of vertical or inclined tubes, B, which are closed at the lower end, and at the upper end are inserted into rectangular iron vessels with which they have free communication. Within the tubes B are placed other smaller tubes, D, which extend from near the bottom of the external tube to a short space above the bottom of the vessels C, and pass through a perforated plate, E, placed parallel with the bottom of the vessel C. The vessels C are connected with a steam-drum or main steam-pipe, F, by means of the pipes G, and are supplied with water and emptied by means of the pipes H connecting them with the pipe I, on which are placed the feed-cock or valve K and the blow-off cock or valve L.

Upon water being supplied to the boiler to about the level of the perforated plates E, and heat being applied in the furnace, an ascending current is formed in the annular spaces between the tubes D and B, and a descending current in the tube D, and this circulating action becomes more and more active, as the temperature is increased by reason of the heated column of water containing bubbles of steam between the tubes B and D being lighter than the column of less heated water in the tubes D. The functions of the perforated plate E are to support the tubes D, and also to facilitate the separation of the steam from the currents of water rising from the annular spaces between the tubes B and D. The tubes D are kept in position at the lower ends by means of projections N cast in the caps M, which close the lower ends of the tubes B. These caps M are screwed upon the tubes B, and the tubes are attached to the vessel C by being screwed into the bottom thereof. The ends of the vessels C are made with apertures closed with the plates O secured by the bolts P, and bridge-bars Q, and nuts R, and afford facilities for the introduction of the perforated plates E and the removal of the core used in casting them, and also for inspection and cleansing when necessary. The internal tubes may be made of different material from the external tubes, and a galvanic action thus produced so as to promote the durability and cleanliness of the boiler.

A steam-generator thus constructed possesses the following advantages not common to others: It is more cheaply constructed than others. All of the parts are of such form and dimensions as not to require any great thickness of metal to impart the strength requisite for safe use. None of the parts are of such size or form as to be inconvenient for transportation. It requires but little skill to erect the boiler. All of the tubes are free to expand and contract independently of each other, and thus avoid straining and liability to leakage. There is never at one time a large volume of water contained in the boiler, so that in the event of a rupture of any portion of the boiler a destructive explosion cannot ensue. Any of the tubes may be removed without disturbing the others. The circulation of the water in the boiler when in use is so active as to preclude the deposit of sediment in the tubes, and the heating-surface is thus preserved in a condition of the greatest efficiency. The boiler can be enlarged by the addition of other vessels with the tubes connected therewith, without incuring expensive alterations of the portions already erected.

What I claim as my invention, and desire to secure as such by Letters Patent, is—

1. A sectional steam-generator, composed of separate tanks connected in common to a water-supply and steam-pipe, each tank having a series of vertical or inclined tubes closed at the lower end and suspended in a heating-chamber.

2. In combination with the devices above claimed, the internal tubes and perforated plate, as described.

3. The construction of screw-cap M, as shown and described.

4. The combination of internal and external tubes of different metals susceptible of producing galvanic action.

S. LLOYD WIEGAND.

Witnesses:
JAMES P. PETIT,
JOHN B. DEVINE.